United States Patent
Chen

[19]

[11] Patent Number: 5,881,999
[45] Date of Patent: Mar. 16, 1999

[54] WATER SHUTOFF VALVE ASSEMBLY

[76] Inventor: Chuan-Lung Chen, No. 5, Liao Tsuo Hsiang, Liao Tsuo Li, Lu Kang Chen, Changhua Hsien, Taiwan

[21] Appl. No.: 874,670

[22] Filed: Jun. 13, 1997

[51] Int. Cl.[6] .................................................. F16K 31/00
[52] U.S. Cl. .......................... 251/352; 251/347; 251/287
[58] Field of Search ................................. 251/288, 345, 251/353, 287

[56] References Cited

U.S. PATENT DOCUMENTS

| 2,090,277 | 8/1937 | Williams | 251/345 |
| 3,319,927 | 5/1967 | Thompson | 251/352 |

FOREIGN PATENT DOCUMENTS

| 201954 | 7/1958 | Germany | 251/287 |
| 40284 | 3/1915 | Sweden | 251/345 |
| 51089 | 6/1919 | Sweden | 251/352 |
| 47266 | 11/1919 | Sweden | 251/352 |

*Primary Examiner*—A. Michael Chambers

[57] ABSTRACT

A valve assembly includes a driven shaft rotatably mounted in a housing and including a first end portion extending outward from a first end portion of the housing and a second end portion received in the housing, and a passage defined through the driven shaft. A drive member includes an annular knob fixedly mounted on the first end portion of the driven shaft for rotating the driven shaft. A shutoff valve is fixedly mounted on the second end portion of the driven shaft to rotate therewith, and at least one opening defined in the shutoff valve communicates with the passage. A valve seat abutting the shutoff valve is fixedly mounted in the housing, and at least one hole defined in the valve seat is closed by the shutoff valve. By such an arrangement, the hole communicates with the passage via the opening when the opening is rotated with the shutoff valve to communicate with the through hole.

9 Claims, 4 Drawing Sheets

WATER SHUTOFF VALVE ASSEMBLY

FIELD OF THE INVENTION

The present invention relates to a valve assembly, and more particularly to a water shutoff valve assembly.

BACKGROUND OF THE INVENTION

A conventional water shutoff valve has a complicated structure and cannot be assembled easily, thereby causing an inconvenience during assembly.

The present invention has arisen to mitigate and/or obviate the disadvantage of the conventional water shutoff valve.

SUMMARY OF THE INVENTION

In accordance with one aspect of the present invention, there is provided a water shutoff valve assembly comprising a housing fixedly disposed and including a first end portion and a second end portion.

A driven shaft is rotatably mounted in the housing and includes a first end portion extending outward from the first end portion of the housing and a second end portion received in the housing. A passage is longitudinally defined through the driven shaft.

A drive member includes an annular knob fixedly mounted on the first end portion of the driven shaft for rotating the driven shaft.

A shutoff valve is fixedly mounted on the second end portion of the driven shaft to rotate therewith, and at least one opening is defined in the shutoff valve and communicates with the passage.

A valve seat is fixedly mounted in the housing and abuts the shutoff valve, and at least one through hole is defined in the valve seat and is closed by the shutoff valve.

By such an arrangement, the through hole communicates with the passage via the opening when the opening is rotated with the shutoff valve to communicate with the through hole.

Further features of the present invention will become apparent after a careful reading of the detailed description with reference to the accompanying drawings.

DETAILED DESCRIPTION OF THE PREFERRED EMBODIMENTS

Figure 1:
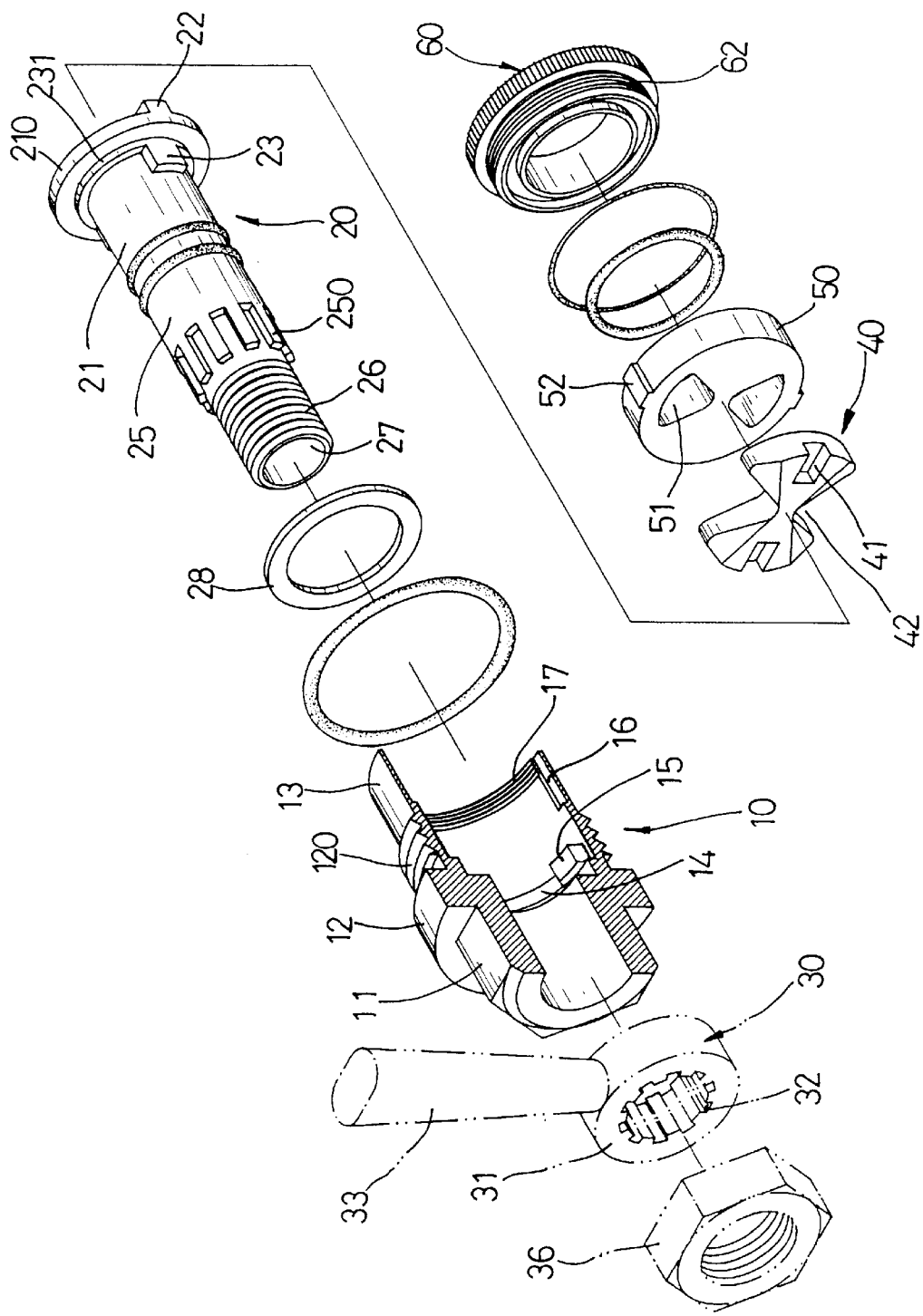
FIG. 1 is an exploded view of a valve assembly in accordance with the present invention.
Figure 2:
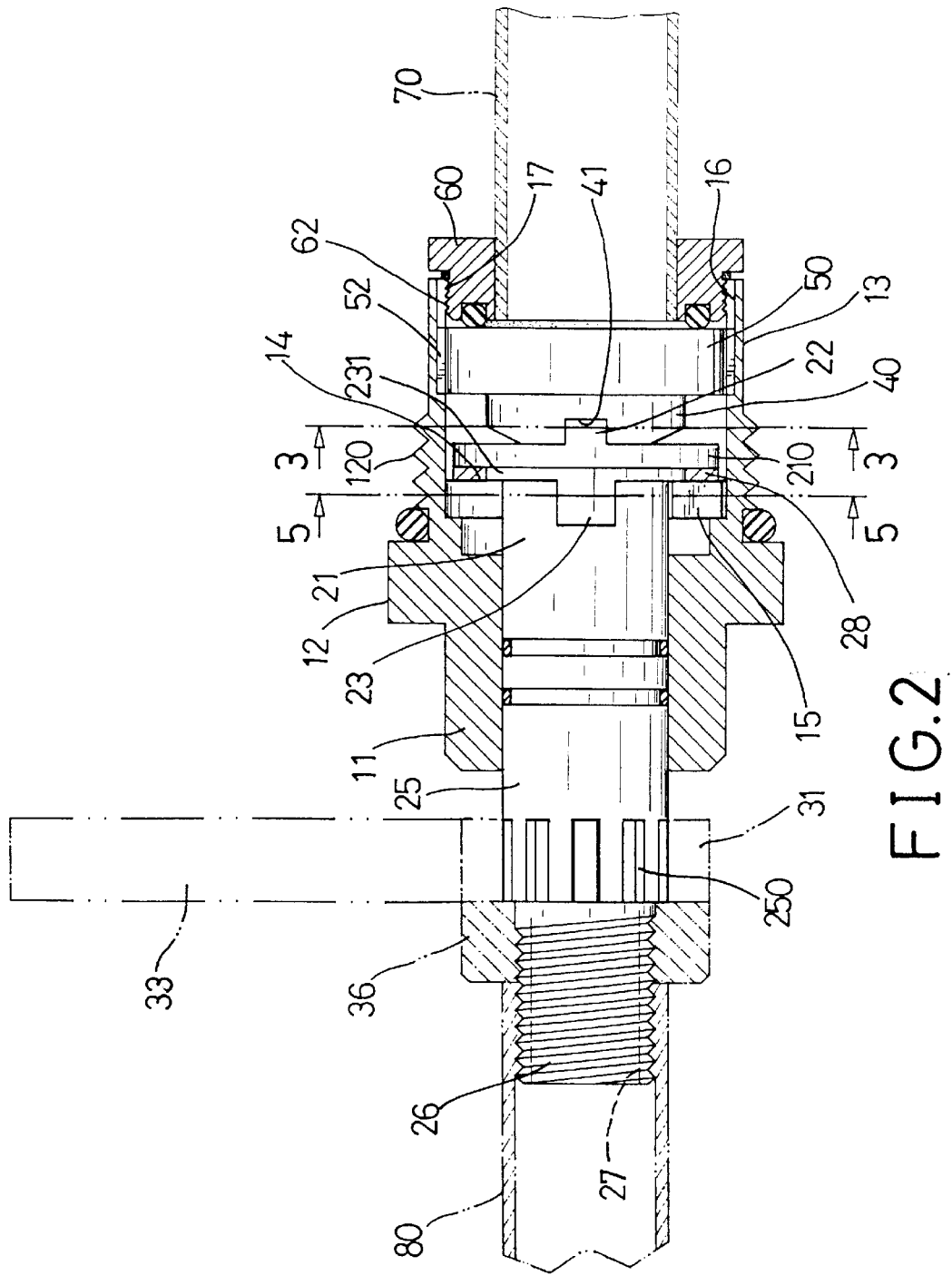
FIG. 2 is a front plan cross-sectional view of FIG. 1.

Referring to the drawings, and initially to FIGS. 1 and 2, a water shutoff valve assembly in accordance with the present invention can be adapted for controlling water to be supplied from a water inlet tube 70 to a water outlet tube 80.

The water shutoff valve assembly comprises a housing 10 fixedly disposed and including a first end portion 11 having a polygonal shape preferably a hexagonal head, and a second end portion 13. A shoulder 12 is formed on an outer wall of the housing 10 located between the first end portion 11 and the second end portion 13 thereof, and an outer thread 120 located adjacent to the shoulder 12 is formed on the outer wall of the housing 10.

A driven shaft 20 is rotatably mounted in the housing 10 and includes a first end portion 25 extending outward from the first end portion 11 of the housing 10, a second end portion 21 received in the housing 10, and a passage 27 longitudinally defined through the driven shaft 20.

A drive member 30 includes an annular knob 31 fixedly mounted on the first end portion 25 of the driven shaft 20 for rotating the driven shaft 20, and a handle 33 fixedly connected to the knob 31 for rotating the knob 31.

A plurality of teeth 250 are each formed on an outer periphery of the first end portion 25 of the driven shaft 20, and a plurality of splines 32 are each defined in an inner wall of the knob 31 for receiving each of the teeth 250 therein, thereby securely fitting the knob 31 on the driven shaft 20.

An outer thread 26 located adjacent to the teeth 250 is formed on the outer periphery of the first end portion 25 of the driven shaft 20, and a positioning nut 36 is threadedly engaged with the outer thread 26 and is urged on the knob 31 for retaining the knob 31 on the driven shaft 20.

An annular inner flange 14 is formed on an inner wall of the housing 10 located between the first end portion 11 and the second end portion 13 thereof. An annular outer flange 210 is formed on an outer wall of the driven shaft 20 located adjacent to the second end portion 210 thereof and is retained by the inner flange 14 of the housing 10.

Preferably, an annular abutment 231 located adjacent to the outer flange 210 is formed on the second end portion 21 of the driven shaft 20, and a washer 28 is mounted around the abutment 231 and is urged between the inner flange 14 and the outer flange 210.

Two diametrically opposite limits 15 are each mounted on the inner flange 14, and two diametrically opposite slides 23 are each mounted on the outer flange 210 to rotate therewith and are each limited to displace only between the two limits 15.

A shutoff valve 40 is fixedly mounted on the second end portion 21 of the driven shaft 20 to rotate therewith, and two diametrically opposite openings 42 are each defined in the shutoff valve 40 and each communicate with the passage 27.

A valve seat 50 is fixedly mounted in the housing 10 and abuts the shutoff valve 40, and two diametrically opposite through holes 51 are each defined in the valve seat 50 and are each closed by the shutoff valve 40.

By such an arrangement, each of the through holes 51 communicate2 with the passage 27 via an associated opening 42 when the opening 42 is rotated with the shutoff valve 40 to communicate with the through hole 51.

Two diametrically opposite lugs 22 are each formed on the outer flange 210 of the driven shaft 20, and two diametrically opposite recesses 41 are each defined in the shutoff valve 40 for receiving a corresponding one of the two lugs 22 therein, thereby securely fitting the shutoff valve 40 on the driven shaft 20.

Two diametrically opposite ribs 52 are each formed on an outer wall of the valve seat 50, and two diametrically opposite depressions 16 are each defined in the inner wall of the housing 10 for receiving a corresponding one of the two ribs 52 therein, thereby retaining the valve seat 50 in the housing 10.

An inner thread 17 is formed on an inner wall of the housing 10 located adjacent to the second end portion 13 thereof, and an end cap 60 is fixedly mounted on the second end portion 13 of the housing 10 through an outer thread 62 formed on a periphery thereof being threadedly engaged with the inner thread 17 of the housing 10.

In assembly, again referring to FIGS. 1 and 2, the driven shaft 20 can be rotatably retained in the housing 10 while the drive member 30 is secured on the driven shaft 20 by the positioning nut 36, and the end cap 60 is mounted on the second end portion 13 of the housing 10 for retaining the shutoff valve 40 and the valve seat 50 in the housing 10, thereby integrating and assembling the water shutoff valve assembly into a one-piece unit as shown in FIG. 2.

The water outlet tube 80 can be fitted onto the outer thread 26 of the driven shaft 20, and the second end portion 13 of the housing 10 can then be inserted into a vertical wall (not shown) of a water source (not shown), with the outer thread 120 being fitted into a threaded hole (not shown) of the vertical wall by means of a spanner (not shown) operating the hexagonal head 11 of the housing 10, and with the shoulder 12 abutting the vertical wall, while the water inlet tube 70 can be fitted into the end cap 60 such that water can be supplied from the inlet tube 70 to the outlet tube 80.

Figure 3:
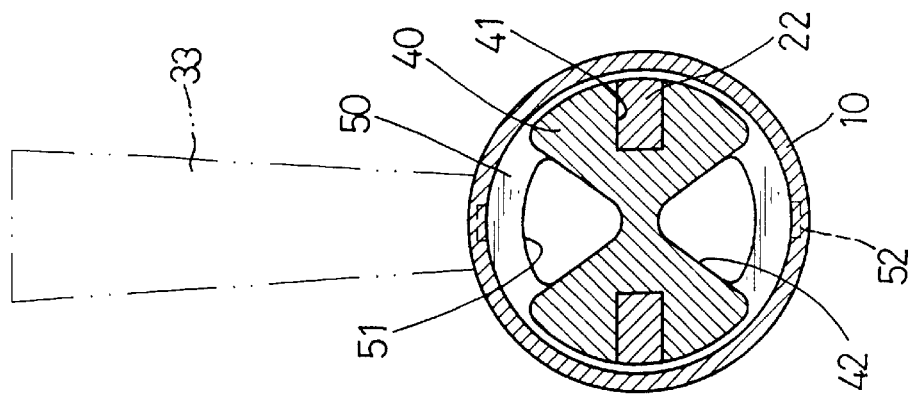
FIG. 3 is a side cross-sectional view taken along line 3—3 of FIG. 2.
Figure 4:
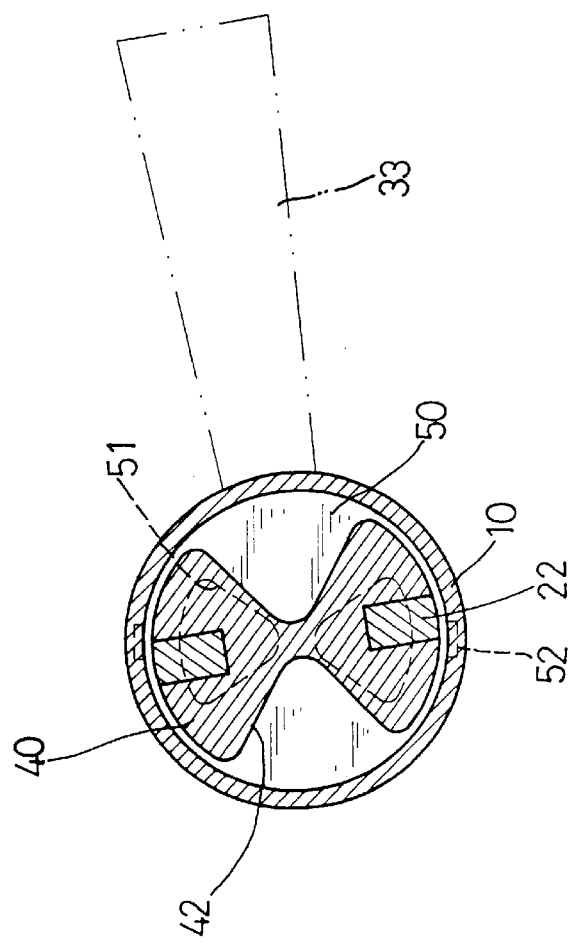
FIG. 4 is an operational view of FIG. 3.

In operation, referring to FIGS. 3 and 4 with reference to FIGS. 1 and 2, in the situation as shown in FIG. 3, each of the two openings 42 of the shutoff valve 40 align with an associated hole 51 of the valve seat 50 such that water can be introduced from the inlet tube 70 into the passage 27 via the holes 51 and the openings 42, and can then flow into the outlet tube 80.

The handle 33 can then be rotated to the position as shown in FIG. 4 such that each of the holes 51 of the valve seat 50 is closed by a wall of the shutoff valve 40, thereby preventing water from entering the passage 27, and thereby shutting off the water supply.

Figure 5:
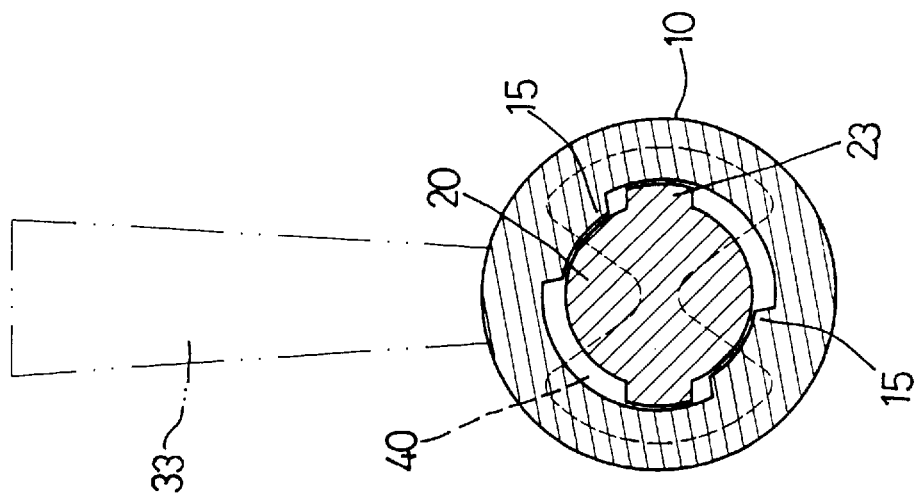
FIG. 5 is a side cross-sectional view taken along line 5—5 of FIG. 2.
Figure 6:
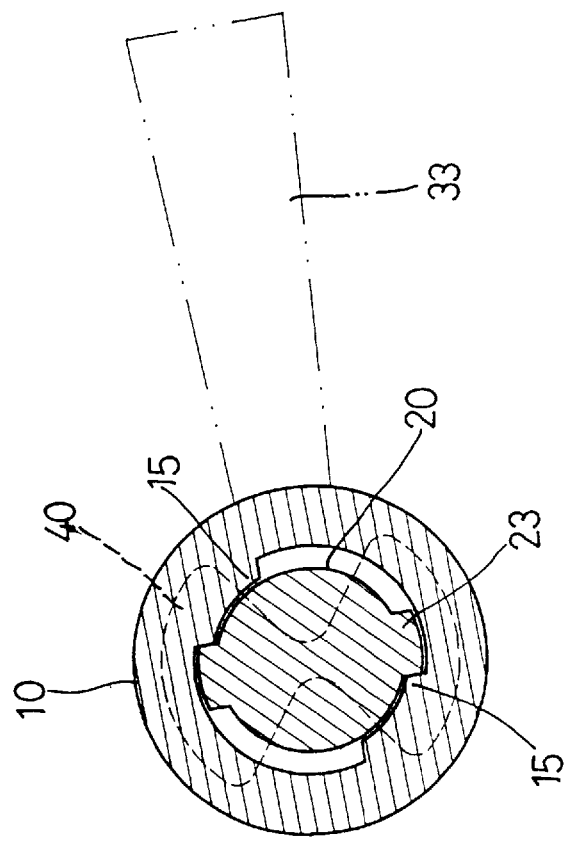
FIG. 6 is an operational view of FIG. 5.

Referring now to FIGS. 5 and 6 with reference to FIGS. 1 and 2, in the situation as shown in FIG. 5, each of the slides 23 of the driven shaft 20 can be moved in the housing 10 by rotating the handle 33 to a position as shown in FIG. 6 where each of the slides 23 is stopped by the associated limit 15.

It is to be noted that, in the situation as shown in FIG. 5, the shutoff valve 40 is disposed at an "open" state as shown in FIG. 3, that is, water can be introduced into the passage 27 via the holes 51 and the openings 42, and in the situation as shown in FIG. 6, the shutoff valve 40 is disposed at a "closed" state as shown in FIG. 4, that is, water is shut off.

By such an arrangement, each of the limits 15 of the housing 10 can be used to limit the displacement of each of the slides 23 of the driven shaft 20.

It should be clear to those skilled in the art that further embodiments of the present invention may be made without departing from the scope and spirit of the present invention.

What is claimed is:

1. A valve assembly, comprising:
   a housing fixedly disposed and including an inner wall, a first end portion and a second end portion and having an inner thread formed on the inner wall of said housing and located adjacent to said second end portion of said housing;
   a driven shaft rotatably mounted in said housing and including a first end portion extending outward from said first end portion of said housing and a second end portion received in said housing, a passage longitudinally defined through said driven shaft;
   a drive member including an annular knob fixedly mounted on said first end portion of said driven shaft for rotating said driven shaft;
   a shutoff valve fixedly mounted on said second end portion of said driven shaft to rotate therewith, and at least one opening defined in said shutoff valve and communicating with said passage;
   a valve seat fixedly mounted in said housing and abutting said shutoff valve, and at least one through hole (51) defined in said valve seat and closed by said shutoff valve, wherein said through hole communicates with said passage via said opening when said opening is rotated with said shutoff valve to communicate with said through hole; and
   an end cap fixedly mounted on said second end portion of said housing and including a periphery formed with an outer thread threadedly engaged in said inner thread of said housing.

2. The valve assembly in accordance with claim 1, wherein said first end portion of said housing has an outer periphery with a polygonal shape.

3. The valve assembly in accordance with claim 1, wherein a shoulder is formed on an outer wall of said housing located between said first end portion and said second end portion thereof, and an outer thread is formed on said outer wall of said housing and located adjacent to said shoulder.

4. The valve assembly in accordance with claim 1, wherein an annular inner flange is formed on an inner wall of said housing located between said first end portion and said second end portion thereof, and an annular outer flange is formed on an outer wall of said driven shaft located adjacent to said second end portion thereof and is retained by said inner flange of said housing.

5. The valve assembly in accordance with claim 4, wherein two diametrically opposite limits are each mounted on said inner flange, and two diametrically opposite slides are each mounted on said outer flange to rotate therewith and are each limited to displace only between said two limits.

6. The valve assembly in accordance with claim 4, wherein two diametrically opposite lugs are each formed on said outer flange of said driven shaft, and two diametrically opposite recesses are each defined in said shutoff valve for receiving a corresponding one of said two lugs therein.

7. The valve assembly in accordance with claim 1, wherein two diametrically opposite ribs are formed on an outer wall of said valve seat, and two diametrically opposite depressions are each defined in an inner wall of said housing for receiving a corresponding one of said two ribs therein.

8. The valve assembly in accordance with claim 1, wherein a plurality of teeth are formed on an outer periphery of said first end portion of said driven shaft, and a plurality of splines are each defined in an inner wall of said annular knob for receiving each of said teeth therein.

9. The valve assembly in accordance with claim 1, wherein an outer thread is formed on an outer periphery of said first end portion of said driven shaft, and a positioning nut is engaged with said outer thread for retaining said annular knob.

* * * * *